United States Patent
Majidian

(10) Patent No.: US 8,959,428 B2
(45) Date of Patent: Feb. 17, 2015

(54) METHOD AND APPARATUS FOR GENERATING AN INTEGRATED VIEW OF MULTIPLE DATABASES

(75) Inventor: Andrei Majidian, Suffolk (GB)

(73) Assignee: British Telecommunications Public Limited Company, London (GB)

( * ) Notice: Subject to any disclaimer, the term of this patent is extended or adjusted under 35 U.S.C. 154(b) by 412 days.

(21) Appl. No.: 12/689,574

(22) Filed: Jan. 19, 2010

(65) Prior Publication Data

US 2010/0192057 A1     Jul. 29, 2010

(30) Foreign Application Priority Data

Jan. 19, 2009 (EP) ..................................... 09250135

(51) Int. Cl.
*G06F 17/00* (2006.01)
*G06F 17/30* (2006.01)
*G06F 17/22* (2006.01)

(52) U.S. Cl.
CPC ........ *G06F 17/30908* (2013.01); *G06F 17/227* (2013.01); *G06F 17/2247* (2013.01)
USPC ............ 715/239; 715/234; 715/236; 715/237

(58) Field of Classification Search
CPC .............. G06F 17/2247; G06F 17/227; G06F 17/2211; G06F 17/2725
USPC .................. 715/200, 234, 236, 237, 239, 273
See application file for complete search history.

(56) References Cited

U.S. PATENT DOCUMENTS 6,519,617 B1     2/2003   Wanderski et al.
7,174,327 B2     2/2007   Chau et al.

(Continued)

FOREIGN PATENT DOCUMENTS

WO     WO 02/054291 A3     7/2002
WO     WO 03/021415 A1     3/2003

OTHER PUBLICATIONS

Moh et al., "Re-engineering Structures from Web Documents", 2000, ACM, pp. 67-76 (10 pgs.).

(Continued)

*Primary Examiner* — Stephen Hong
*Assistant Examiner* — Gregory J Vaughn
(74) *Attorney, Agent, or Firm* — Nixon & Vanderhye PC

(57) ABSTRACT

A computer system 1 is operable to receive a plurality of XML (or other marked-up) documents associated with heterogeneous databases 20, 30 and to process these to generate a virtual integrated view presenting a seemingly merged view of the database structures. The computer system includes an input interface for receiving a plurality of marked-up documents, a document object model generation module operable to generate a tree-structured document object model of each marked-up document; an intermediate structure generation module operable to traverse each document object model to generate an intermediate structure comprising a list of lists of elements and sub-elements; a syntax tree generation module for generating a syntax tree representation of the intermediate structure; and a virtual integrated view module operable to generate a view of the syntax tree representation which may be conveniently displayed to the user on a graphical display, wherein by providing the system with a plurality of marked-up documents reflecting the structures of a plurality of databases, the virtual integrated view module is operable to provide a virtual integrated view of the plurality of databases.

9 Claims, 12 Drawing Sheets

(56) References Cited

U.S. PATENT DOCUMENTS

| | | | |
|---|---|---|---|
| 7,805,289 B2* | 9/2010 | Zhou et al. ................. | 704/7 |
| 7,908,550 B1* | 3/2011 | Chittu et al. ................. | 715/234 |
| 2002/0038319 A1 | 3/2002 | Yahagi | |
| 2002/0184213 A1 | 12/2002 | Lau et al. | |
| 2003/0018646 A1 | 1/2003 | Ohta et al. | |
| 2003/0069908 A1* | 4/2003 | Anthony et al. ............. | 707/513 |
| 2003/0120651 A1* | 6/2003 | Bernstein et al. ............ | 707/6 |
| 2003/0154444 A1 | 8/2003 | Tozawa et al. | |
| 2004/0002952 A1 | 1/2004 | Lee et al. | |
| 2005/0060332 A1* | 3/2005 | Bernstein et al. ............ | 707/100 |
| 2006/0173865 A1* | 8/2006 | Fong ............................ | 707/100 |
| 2006/0288275 A1* | 12/2006 | Chidlovskii et al. .......... | 715/513 |
| 2008/0010056 A1* | 1/2008 | Zhou et al. ................... | 704/8 |
| 2008/0134019 A1* | 6/2008 | Wake et al. ................... | 715/239 |
| 2008/0215559 A1* | 9/2008 | Fontoura et al. .............. | 707/4 |
| 2008/0263068 A1* | 10/2008 | Wang et al. .................. | 707/100 |
| 2008/0320023 A1* | 12/2008 | Fong ............................ | 707/101 |
| 2009/0254574 A1* | 10/2009 | De et al. ...................... | 707/100 |
| 2011/0295901 A9* | 12/2011 | Tormasov ..................... | 707/793 |

OTHER PUBLICATIONS

GB Search Report dated Jun. 16, 2004.
International Search Report dated Oct. 14, 2005.
Ahonen, "Automatic Generation of SGML Content Models", Electronic Publishing Origination, Dissemination and Design Wiley UK, vol. 8, No. 2-3, Jun. 1995, pp. 195-206, XP002349145.
Ahonen, "Disambiguation of SGML Content Models", Principles of Document Processing, Third International Workshop, PODP '96, Proceedings Springer-Verlag Berlin, Germany, 1997, pp. 27-37, XP002349146.
Jong-Seok Jeong et al., "Extracting Information from Semi-Structured Internet Sources", Industrial Electronics, 2001, Proceedings, ISIE 2001, IEEE International Symposium on Jun. 12-16, 2001, Piscataway, NJ, IEEE, vol. 2, Jun. 12, 2001, pp. 1378-1381, XP01048669.
Jong-Seok Jung et al, "Extracting Information from XML documents by Reverse Generating a DTD", Eurasia-ICT 2002, Information and Communication Technology, First Eurasian Conference, Proceedings (Lecture Notes in Computer Science vol. 2510) Springer-Verlag Berlin, Germany 2002, pp. 314-321, XP002349144.
Goeschka et al., "XML Based Robust Client-Server Communication for a Distributed Telecommunication Management System", System Sciences, 2003, Proceedings of the 36th Annual Hawaii International Conference on Jan. 6-9, 2003, Piscataway, NJ, USA, IEEE, Jan. 6, 2003, pp. 122-131, XP010626425.
The UK Patent Office search carried out on the priority application—Feb. 9, 2003.
Bray et al., "Extensible Markup Language (XML) 1.0 (3rd edition) W3C Recommendation", W3C Standard, Feb. 4, 2004, XP002322413 (pp. 1-49).
Moh et al., "DTD-Miner: a Tool for Mining DTD from XML Documents", Proceedings Second International Workshop on Advanced Issues of E-Commerce and Web-Based Information Systems. WECWIS 2000 IEEE Comput. Soc Los Allamitos, CA, USA, 2000, XP002349143, (pp. 1-8).
International Business Machines Corporation: "System and Method for Java Serialization Compatibility Using XML", Research Disclosure, Kenneth Mason Publications, Westbourne, GB, vol. 455, No. 159, Mar. 2002, XP007130094, (2 pages).
Kay, "DTDGen—XML DTD Generator" Online Publication, Apr. 28, 1998, XP002225792 (2 pages).
Anonymous: "PRB: 'Schema Is Non-Deterministic' Error Message", Online Publication, XP002349296, Retrieved from the Internet:URL:http://support.microsoft.com/default.aspx?scid=kb;EN-US;q316297>, Oct. 11, 2007 (pp. 1-3).

* cited by examiner

METHOD AND APPARATUS FOR GENERATING AN INTEGRATED VIEW OF MULTIPLE DATABASES

This application claims priority to European Application No. 09250135.2, filed 19 Jan. 2009 the entire content of which is hereby incorporated by reference.

FIELD OF THE INVENTION

The present invention relates to a method and apparatus for generating a virtual integrated view of multiple databases (which may be heterogeneous). The view is virtual in the sense that the underlying databases are not actually integrated, the view merely presents the structure of the databases as a whole giving an impression of the underlying databases having been integrated together. In particular, the method relates to the processing of XML files (or other marked-up documents) each of which is associated with a particular database and has a structure which reflects the structure of its associated database, in order to generate a view of the structure of all of the associated databases in a merged manner. Furthermore, the present invention also relates in another aspect to a method and apparatus for enabling a party to communicate with a plurality of different parties in which different sets of data need to be communicated with different ones of the parties, to enable electronic representations of the different sets of data to be made in such a way that they will be readily processable by all of the parties involved.

BACKGROUND TO THE INVENTION

In order to assist computers in transferring information between one another in a reliable manner, it has recently been proposed that a computer language known as eXtensible Mark-up Language (XML) should be used to generate text files structured in a well-defined manner which enables information contained in the fifes to be reliably extracted by a receiving computer. As is well known in the art, XML is fully declarative, by which it is meant that the significance of many so-called "tags" used in XML files may be user defined. For a discussion of XML see any one of numerous published books on the subject such as "XML for Dummies" by Maria H. Aviram published by IDG Books Worldwide Inc., or see the Internet web-site of the World Wide Web Consortium for information about XML.

Because XML is declarative, XML may be considered as being a "meta-language" which can be used to define individual markup languages which can then be used to generate well structured documents. In order to determine if a particular document is well-structured (i.e. that it complies with the rules of a particular mark-up language) it may be compared with (or "validated" by) either an XML-schema or a Document Type Definition (DTD) file.

Generally speaking, in order to generate XML documents for easy transfer of information between computers, a user generates a DTD or XML-schema file first and then writes subsequent XML files which conform to the "rules" specified in the XML-schema or DTD file. However, in some circumstances, it may be more convenient to write one or more example XML files first and then to generate automatically a suitable XML-schema or DTD file which is appropriate for the or each example XML file.

A number of applications have been developed which provide this functionality. For example, Microsoft Corp. has written a utility which permits an XML-schema to be inferred from an example XML file and also for an XML-schema to be modified to account for a single additional example XML-schema. The utility is referred to as the XSD Inference Utility. Note that in order to use the utility a user would have to write and compile his own specialised code (using the same programming language as that in which the utility has been written). Furthermore, the methodology adopted in this utility results in the utility having a number of drawbacks. In particular, the utility tends to produce unnecessarily long and complicated XML-schema. Additionally, only a single XML file may be processed at any one time by the unmodified utility.

Published International Patent Application No WO 2005/083591 describes a method of generating concise validating documents (DTD's or XML schemes) for any number of input XML files which need not (and indeed most advantageously do not) describe the same type of thing (i.e. the XML files may be heterogeneous, although possibly overlapping to some extent). This document also describes the use of such validating files for assisting in permitting separate parties to communicate information with one another by gathering together a set of example XML files comprising example files from all of the parties wishing to communicate data between one another (e.g. as part of a collaboration (e.g. for a project) of some sort) and then generating a validator file to cover the entire set of example XML files. The manner in which the validator file is produced involves serially forming a Document Object Model (DOM) tree of each of the example files and then traversing each such tree to build up an intermediate representation which combines the features of each example file, and then converting the intermediate representation into a validator file.

SUMMARY OF THE INVENTION

According to a first aspect of the present invention, there is provided a method of generating a syntax tree representation of a plurality of marked-up documents, the method including:
in respect of each of the plurality of marked-up documents, generating a tree-structured document object model of the marked-up document;
traversing each document object model to generate an intermediate structure comprising a list of lists of elements and sub-elements in which, preferably, each time a node is encountered which does not have the same name as any previously encountered node, a new list is created in the intermediate structure referencing the node in question, and each time a node is encountered which does have the same name as any previously encountered node, its child and attribute lists are compared with those of the or each previously encountered node having the same name and if there is a match, no reference is made to the newly encountered node, but if there is a mismatch, then a new reference is made within the same list as the previously encountered node of the same name; and
generating a syntax tree representation of the intermediate structure.

Preferably the marked-up documents are documents marked-up according to the eXtensible Markup Language (XML) standard.

The syntax tree representation of the plurality of marked-up documents can be conveniently used for many different purposes. For example, it may be used to produce a Document Type Definition (DTD) document or an XML-schema definition file (also known as simply an XML-schema file) either of which can be used to validate all of the plurality of marked up documents (used to generate the syntax tree). In this respect, the present invention represents an improvement over the invention described in WO 2005/083591 the contents of which are hereby incorporated into the present application by way of reference since the abstract syntax tree representation represents a useful internal representation of the merged structure—a large number of software tools (e.g. applications packages, API's, etc.) exist which can efficiently process abstract syntax trees and by providing the data in this format it is possible to leverage these existing tools most effectively.

Alternatively the abstract syntax tree representation may be used to generate a virtual unified view or model of the structure of the data represented with in the marked-up documents.

According to a second aspect of the present invention, there is provided a method of generating a virtual unified model of a combination of heterogeneous databases, the method comprising:

generating a syntax tree representation of a plurality of marked-up documents, each of which reflects the structure of an associated database, by, in respect of each of the plurality of marked-up documents, generating a tree-structured document object model of the marked-up document; traversing each document object model to generate an intermediate structure comprising a list of lists of elements and sub-elements in which, preferably, each time a node is encountered which does not have the same name as any previously encountered node, a new list is created in the intermediate structure referencing the node in question, and each time a node is encountered which does have the same name as any previously encountered node, its child and attribute lists are compared with those of the or each previously encountered node having the same name and if there is a match, no reference is made to the newly encountered node, but if there is a mismatch, then a new reference is made within the same list as the previously encountered node of the same name; and generating a syntax tree representation of the intermediate structure; and generating a virtual model of the databases based on the syntax tree representation.

Preferably the virtual view is concerned more with the structure in which data is stored in the underlying databases (and as reflected in the associated XML or other marked-up documents) rather than individual instances of data. The manner in which the XML files reflect the structure of their associated databases is described in greater detail below.

The present invention also provides computer programs and devices for carrying out the above described methods. The computer programs are preferably stored on a suitable carrier medium, preferably a tangible carrier medium such as an optical or a magnetic disc or a non-volatile solid-state memory device, etc.

The computer programs of the present invention have been written in the Java programming language and reference is occasionally made Java objects, methods etc. However, it is intended that this term should also cover corresponding programming constructs in alternative programming languages such as C++, C#, etc.

Note that throughout the specification we may use the term schema in a general way to refer to any of a DTD, an XML schema document or any other similar construct which describes the structure of an XML file (e.g. a RELAX NG document, etc.).

BRIEF DESCRIPTION OF THE FIGURES

In order that the present invention may be better understood, embodiments thereof will now be described, by way of example only, with reference to the accompanying drawings in which.

DETAILED DESCRIPTION OF A FIRST EMBODIMENT

A first embodiment of the present invention which enables complex information to be unambiguously communicated between connected devices will now be described.

Description of the User Terminal

In the first embodiment, an application program, which is key to the correct operation of the method of the first embodiment, is implemented on a general purpose computer system such as that illustrated in FIG. 1 and described in greater detail below. Some of the data used by the application program, together with other computer programs operating to process (or pre-process) that data may be stored on other computer devices, especially computer servers and databases connected to the general computer system of FIG. 1 via a computer network. As with the general computer system of FIG. 1, such devices are well known in the art and are in essence very similar to the computer system illustrated in FIG. 1 with different emphases (e.g. a computer server is unlikely to contain a graphics card or a sound card but is likely to contain multiple Central Processor Unit (CPU) processors, etc.).

Figure 1:
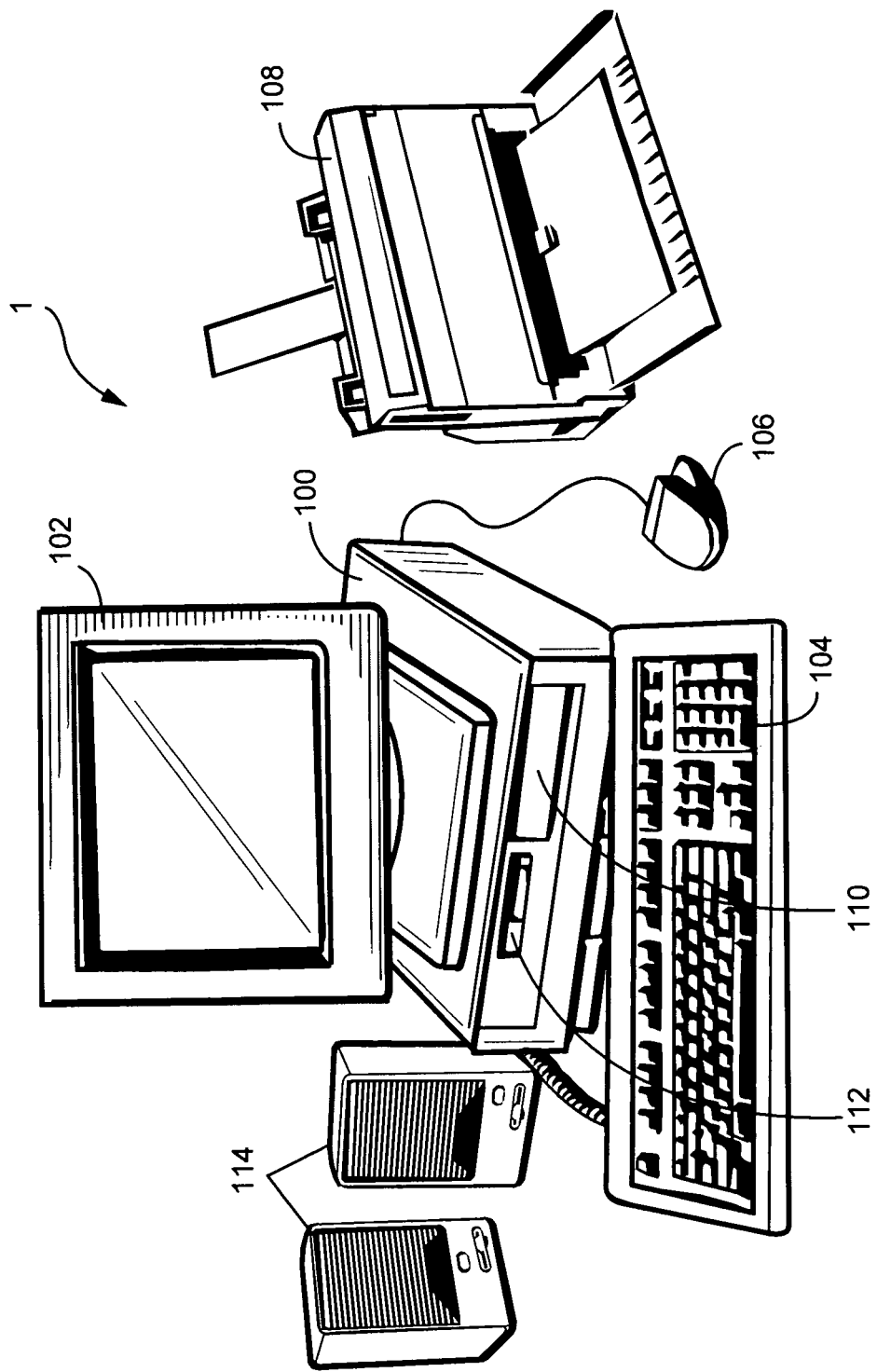
FIG. 1 is an illustration of a general purpose computer system which may form the operating environment of embodiments of the present invention.

FIG. 1 illustrates a general purpose computer system which provides the operating environment of aspects of the embodiments of the present invention. Later, the operation of the invention will be described in the general context of computer executable instructions, such as program modules, being executed by a computer. Such program modules may include processes, programs, objects, components, data structures, data variables, or the like that perform tasks or implement particular abstract data types. Moreover, it should be understood by the intended reader that the invention may be embodied within other computer systems other than those shown in FIG. 1, and in particular hand held devices, notebook computers, main frame computers, mini computers, multi processor systems, distributed systems, etc. Within a distributed computing environment, multiple computer systems may be connected to a communications network and individual program modules of the invention may be distributed amongst the computer systems.

With specific reference to FIG. 1, a general purpose computer system 1 which forms the operating environment of the embodiments of the invention, and which is generally known in the art, comprises a desk-top chassis base unit 100 within which is contained the computer power unit, mother board, hard disk drive or drives, system memory, graphics and sound cards, as well as various input and output interfaces. Furthermore, the chassis also provides a housing for an optical disk drive 110 which is capable of reading from and/or writing to a removable optical disk such as a CD, CDR, CDRW, DVD, or the like. Furthermore, the chassis unit 100 also houses a magnetic floppy disk drive 112 capable of accepting and reading from and/or writing to magnetic floppy disks. The base chassis unit 100 also has provided on the back thereof numerous input and output ports for peripherals such as a monitor 102 having a display screen 3 (see FIGS. 3 and 4) used to provide a visual display to the user, a printer 108 which may be used to provide paper copies of computer output, and speakers 114 for producing an audio output. A user may input data and commands to the computer system via a keyboard 104, or a pointing device such as the mouse 106.

It will be appreciated that FIG. 1 illustrates an exemplary embodiment only, and that other configurations of computer systems are possible which can be used with the present invention. In particular, the base chassis unit 100 may be in a tower configuration, or alternatively the computer system 1 may be portable in that it is embodied in a lap-top or notebook configuration. Other configurations such as personal digital assistants or even mobile phones may also be possible.

Figure 2:
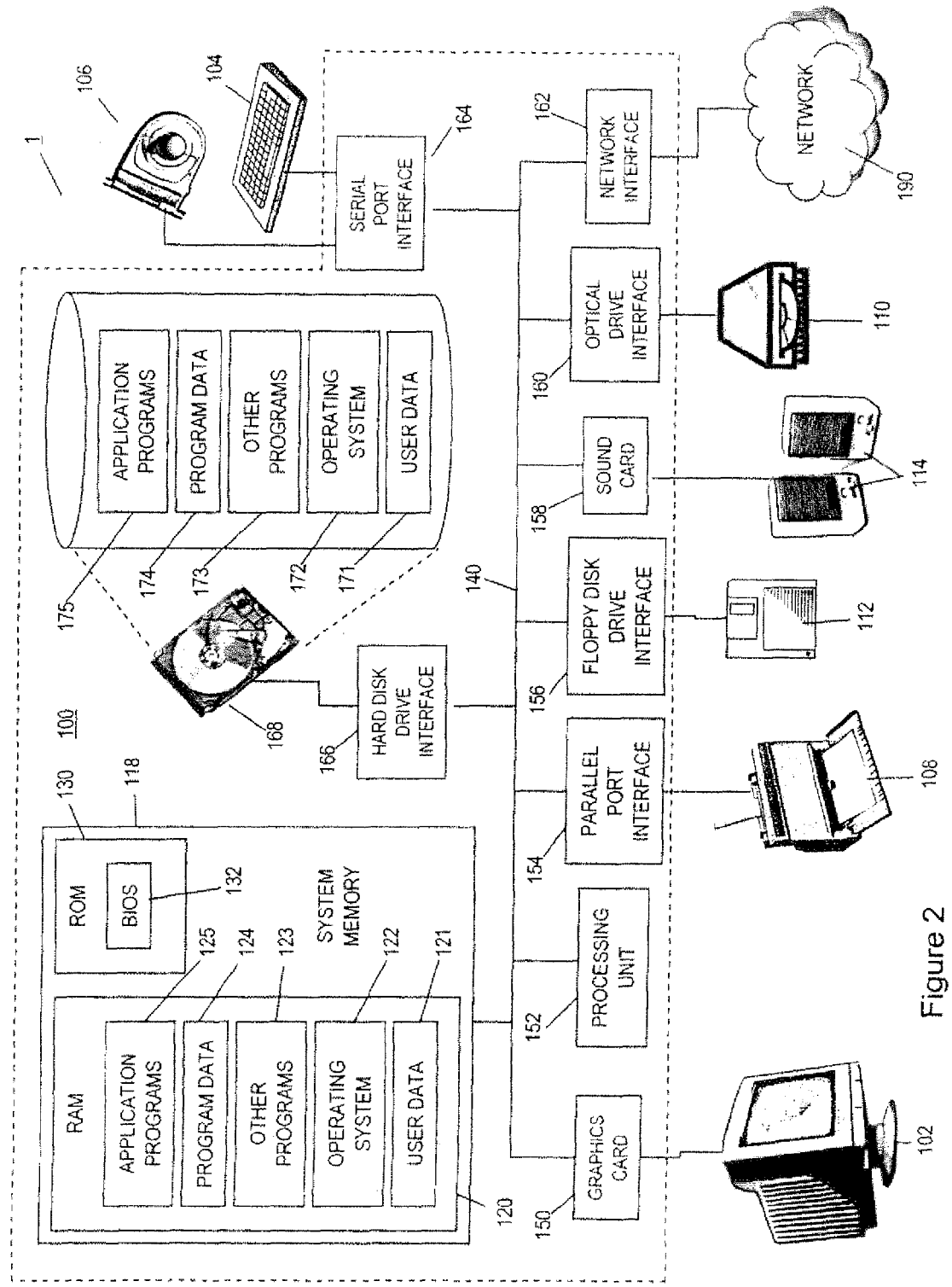
FIG. 2 is a system block diagram of the general purpose computer system of FIG. 1.

FIG. 2 illustrates a system block diagram of the system components of the computer system 1. Those system components located within the dotted lines are those which would normally be found within the chassis unit 100.

With reference to FIG. 2, the internal components of the computer system 1 include a mother board upon which is mounted system memory 118 which itself comprises random access memory 120, and read only memory 130. In addition, a system bus 140 is provided which couples various system components including the system memory 118 with a processing unit 152. Also coupled to the system bus 140 are a graphics card 150 for providing a video output to the monitor 102; a parallel port interface 154 which provides an input and output interface to the system and in this embodiment provides a control output to the printer 108; and a floppy disk drive interface 156 which controls the floppy disk drive 112 so as to read data from any floppy disk inserted therein, or to write data thereto. In addition, also coupled to the system bus 140 are a sound card 158 which provides an audio output signal to the speakers 114; an optical drive interface 160 which controls the optical disk drive 110 so as to read data from and write data to a removable optical disk inserted therein; and a serial port interface 164, which, similar to the parallel port interface 154, provides an input and output interface to and from the system. In this case, the serial port interface provides an input port for the keyboard 104, and the pointing device 106, which may be a track ball, mouse, or the like.

Additionally coupled to the system bus 140 is a network interface 162 in the form of a network card or the like arranged to allow the computer system 1 to communicate with other computer systems over a network 190. This constitutes an input interface whereby marked-up documents may be received by the system for processing as described below. The network 190 may be a local area network, wide area network, local wireless network, or the like. In particular, IEEE 802.11 wireless LAN networks may be of particular use to allow for mobility of the computer system. The network interface 162 allows the computer system 1 to form logical connections over the network 190 with other computer systems such as servers, routers, or peer-level computers, for the exchange of programs or data.

In addition, there is also provided a hard disk drive interface 166 which is coupled to the system bus 140, and which controls the reading from and writing to of data or programs from or to a hard disk drive 168. All of the hard disk drive 168, optical disks used with the optical drive 110, and floppy disks used with the floppy disk 112 provide non-volatile storage of computer readable instructions, data structures, program modules, and other data for the computer system 1. Although these three specific types of computer readable storage media have been described here, it will be understood by the intended reader that other types of computer readable media which can store data may be used, and in particular magnetic cassettes, flash memory cards, tape storage drives, digital versatile disks, or the like.

Each of the computer readable storage media such as the hard disk drive 168, or any floppy disks or optical disks, may store a variety of programs, program modules, or data. In particular, the hard disk drive 168 in the embodiment particularly stores a number of application programs 175, application program data 174, other programs required by the computer system 1 or the user 173, a computer system operating system 172 such as Microsoft® Windows®, Linux™, Unix™, or the like, as well as user data in the form of files, data structures, or other data 171. The hard disk drive 168 provides non volatile storage of the aforementioned programs and data such that the programs and data can be permanently stored without power.

In order for the computer system 1 to make use of the application programs or data stored on the hard disk drive 168, or other computer readable storage media, the system memory 118 provides the random access memory 120, which provides memory storage for the application programs, program data, other programs, operating systems, and user data, when required by the computer system 1. When these programs and data are loaded in the random access memory 120, a specific portion of the memory 125 will hold the application programs, another portion 124 may hold the program data, a third portion 123 the other programs, a fourth portion 122 the operating system, and a fifth portion 121 may hold the user data. It will be understood by the intended reader that the various programs and data may be moved in and out of the random access memory 120 by the computer system as required. More particularly, where a program or data is not being used by the computer system, then it is likely that it will not be stored in the random access memory 120, but instead will be returned to non-volatile storage on the hard disk 168.

The system memory 118 also provides read only memory 130, which provides memory storage for the basic input and output system (BIOS) containing the basic information and commands to transfer information between the system elements within the computer system 1. The BIOS is essential at system start-up, in order to provide basic information as to how the various system elements communicate with each other and allow for the system to boot-up.

Whilst FIG. 2 illustrates one embodiment of the invention, it will be understood by the skilled man that other peripheral devices may be attached to the computer system, such as, for example, microphones, joysticks, game pads, scanners, digital cameras, or the like. In addition, with respect to the network interface 162, we have previously described how this is preferably a wireless LAN network card, although equally it should also be understood that the computer system 1 may be provided with a modem attached to either of the serial port interface 164 or the parallel port interface 154, and which is arranged to form logical connections from the computer system 1 to other computers via the public switched telephone network (PSTN).

Where the computer system 1 is used in a network environment, as in the present embodiment, it should further be understood that the application programs, other programs, and other data which may be stored locally in the computer system may also be stored, either alternatively or additionally, on remote computers, and accessed by the computer system 1 by logical connections formed over the network 190.

Generating a Virtual View

Figure 3:
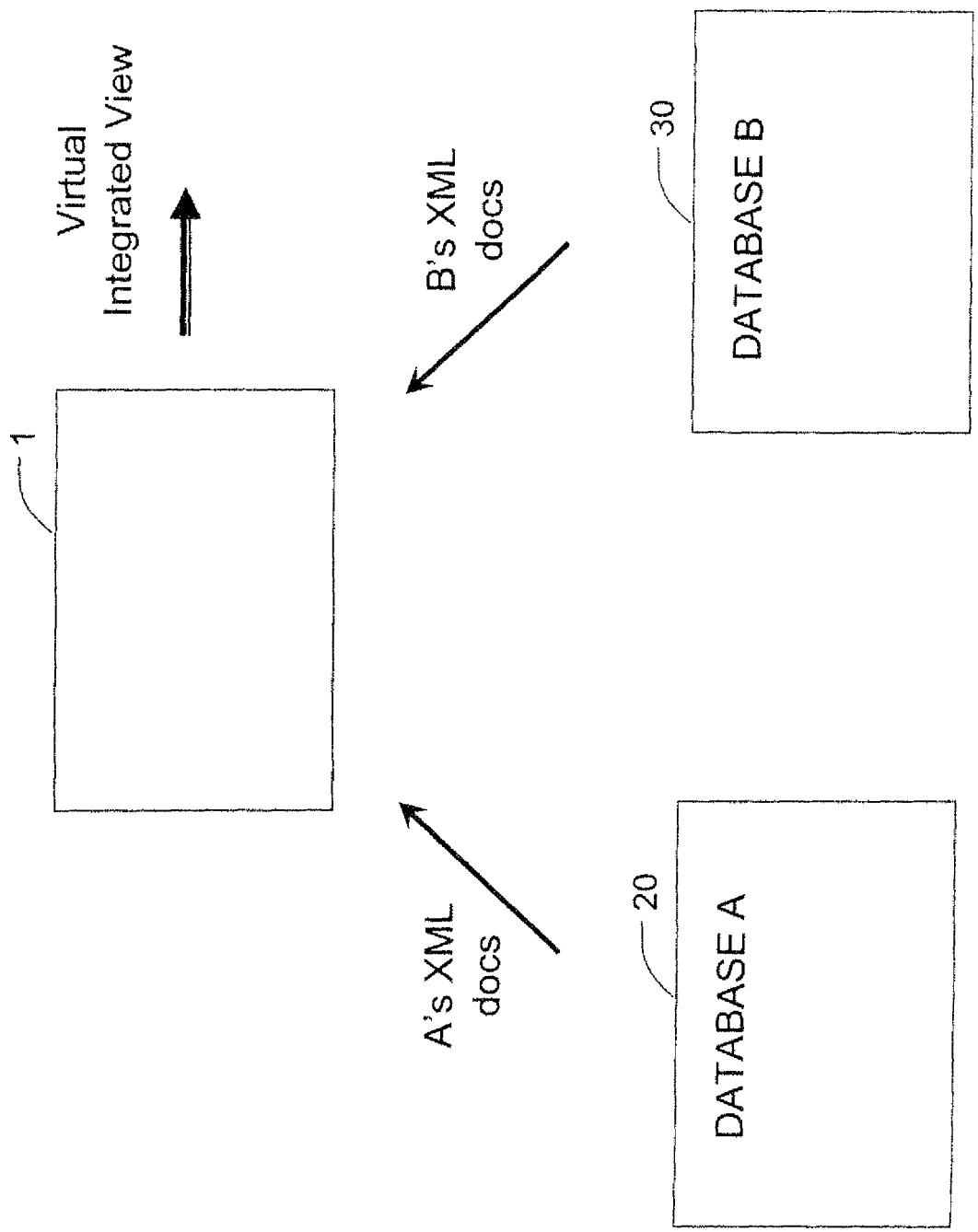
FIG. 3 is a schematic block diagram illustrating the operation of an embodiment of the present invention used to generate a virtual integrated view of a plurality of heterogeneous databases.

In overview, with reference to FIG. 3, the computer system 1 of the present embodiment can be used to generate a virtual view of heterogeneous databases 20, 30. This is done by taking XML documents which reflect the structure of their corresponding databases and processing these in the manner to be described in more detail below to generate a virtual integrated view. As an example of how an XML document may typically reflect the structure of an associated database, consider a relational database containing a table called "Students". This table might have columns "Name", "Address", "Telephone number", "Year" and "Subject". The Subject column might contain a foreign key reference to another table contained in the database called "Subjects" which might have columns "Name", "Year", "Teacher", "Class room", "Times". An XML document might reflect the structure of this database by containing in one document an element "Student" having children elements "Name", "Address", "Telephone number", "Year" and one or more "Subject" children elements. Each "Subject" Child element could have sub-child elements "Name", "Year", "Teacher", "Class room", "Times".

Figure 4:
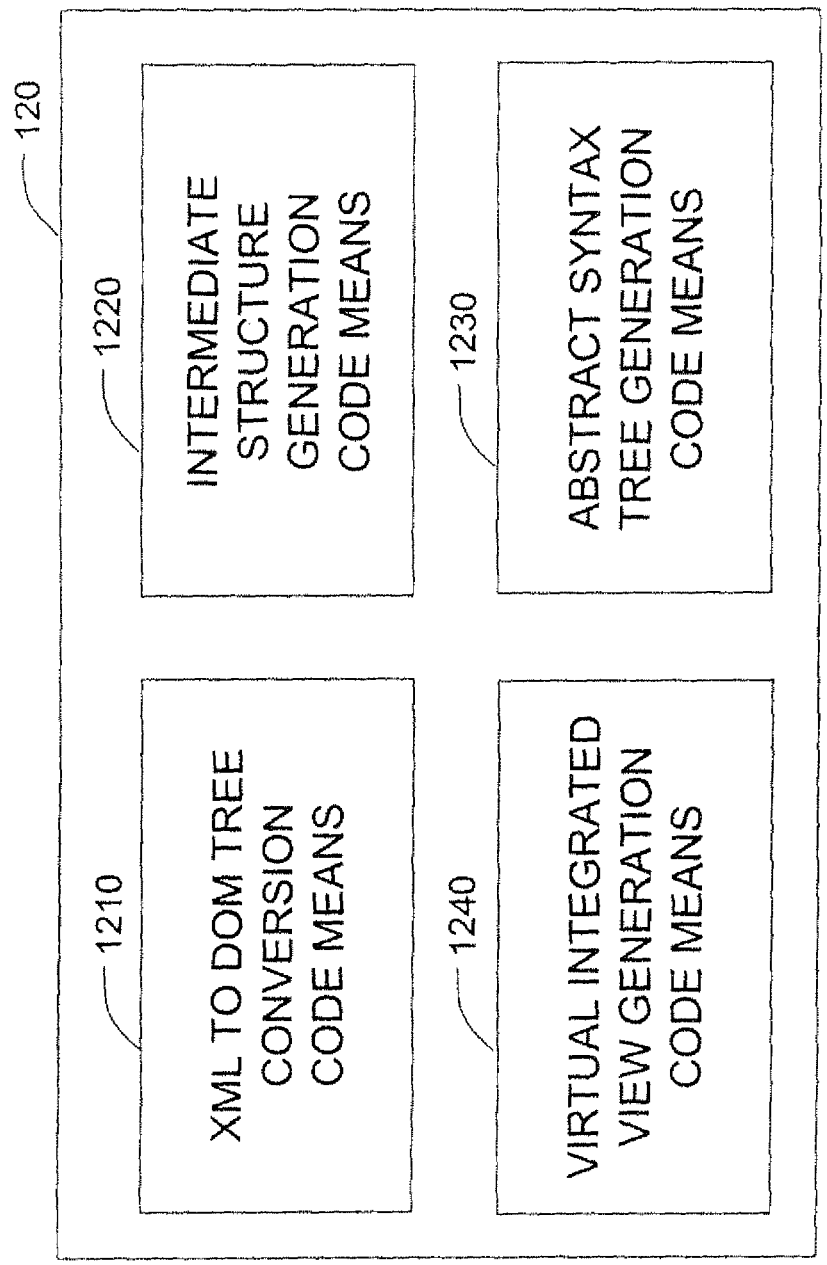
FIG. 4 is a schematic block diagram illustrating some of the computer program modules stored in the memory of the computer system of FIG. 1 which are pertinent to an embodiment of the present invention.

FIG. 4 illustrates schematically the pertinent software modules of the computer system 1, contained within the system RAM 120, which permit the virtual integrated view of databases 20, 30 to be formed. In particular, there is an XML document to DOM tree conversion module 1210 which converts an input XML file into a DOM tree representation of the file (any suitable DOM parser can be used to implement this module—e.g. the Xerces DOM parser). There is also an Intermediate structure generation module 1220 which takes any number of DOM tree representations of input XML files and generates an Intermediate Structure which merges the different XML documents; the precise way in which this is done is described in more detail below. Also included is an Abstract Syntax Tree generation module 1230; this takes the intermediate structure and generates an Abstract Syntax Tree representation of the intermediate structure. Again, the precise way in which this is done is described in detail below. Finally the system RAM 120 also includes a virtual integrated view generation module 1240; this takes the Abstract Syntax Tree generated by the AST generation module and creates a virtual integrated view from this. This is easily implemented using, for example, Java, in particular a program using the Java JTree API to render the AST as a Java JTree.

Figure 5:
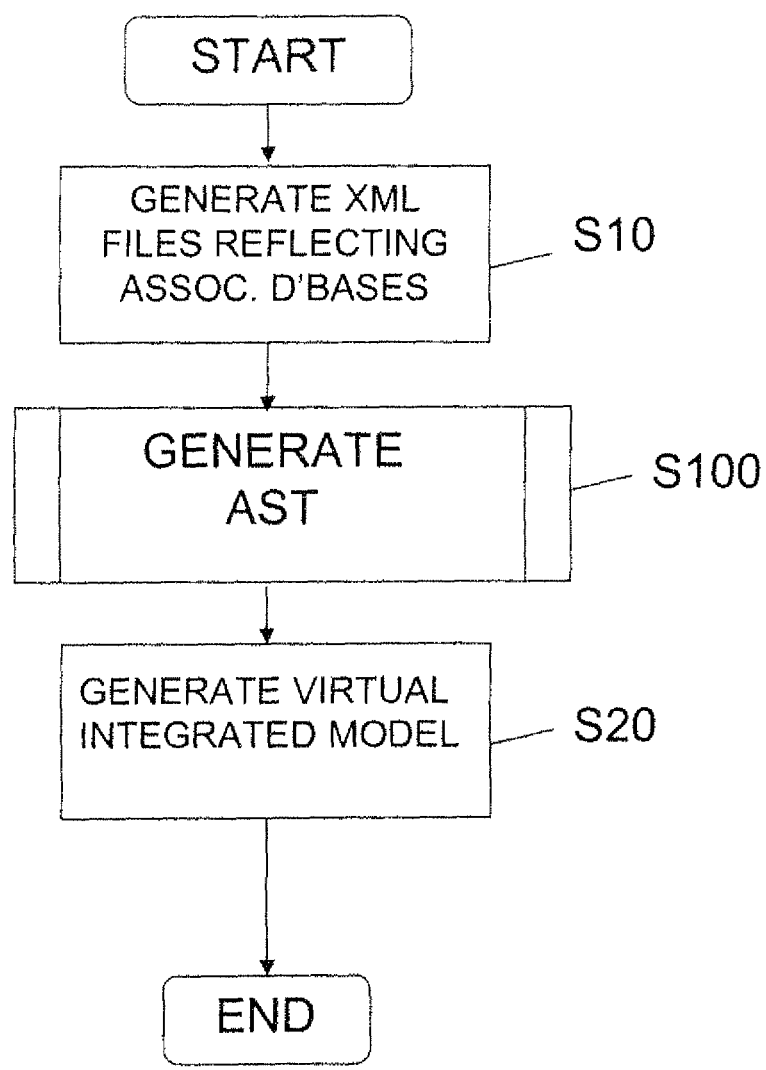
FIG. 5 is a flow diagram illustrating the principle steps of a method according to an embodiment of the present invention.

Referring now to FIG. 5, the steps performed by the system 1 to generate the virtual integrated view are now described. At step S10, the databases 20, 30 (or some devices(s) connected thereto) generate example XML documents which reflect the structure of the associated databases (by having a similar structure themselves). Then in step S100 all such example XML files are processed to generate an Abstract Syntax Tree (AST) representation of a merger of these XML documents (as described in greater detail below). Finally, in step S20, an XPath based application uses the AST to generate a virtual integrated view of the databases 20, 30 with which the user may generate complex XPath based queries which can be answered (where possible) by the XPath based application.

Figure 6:
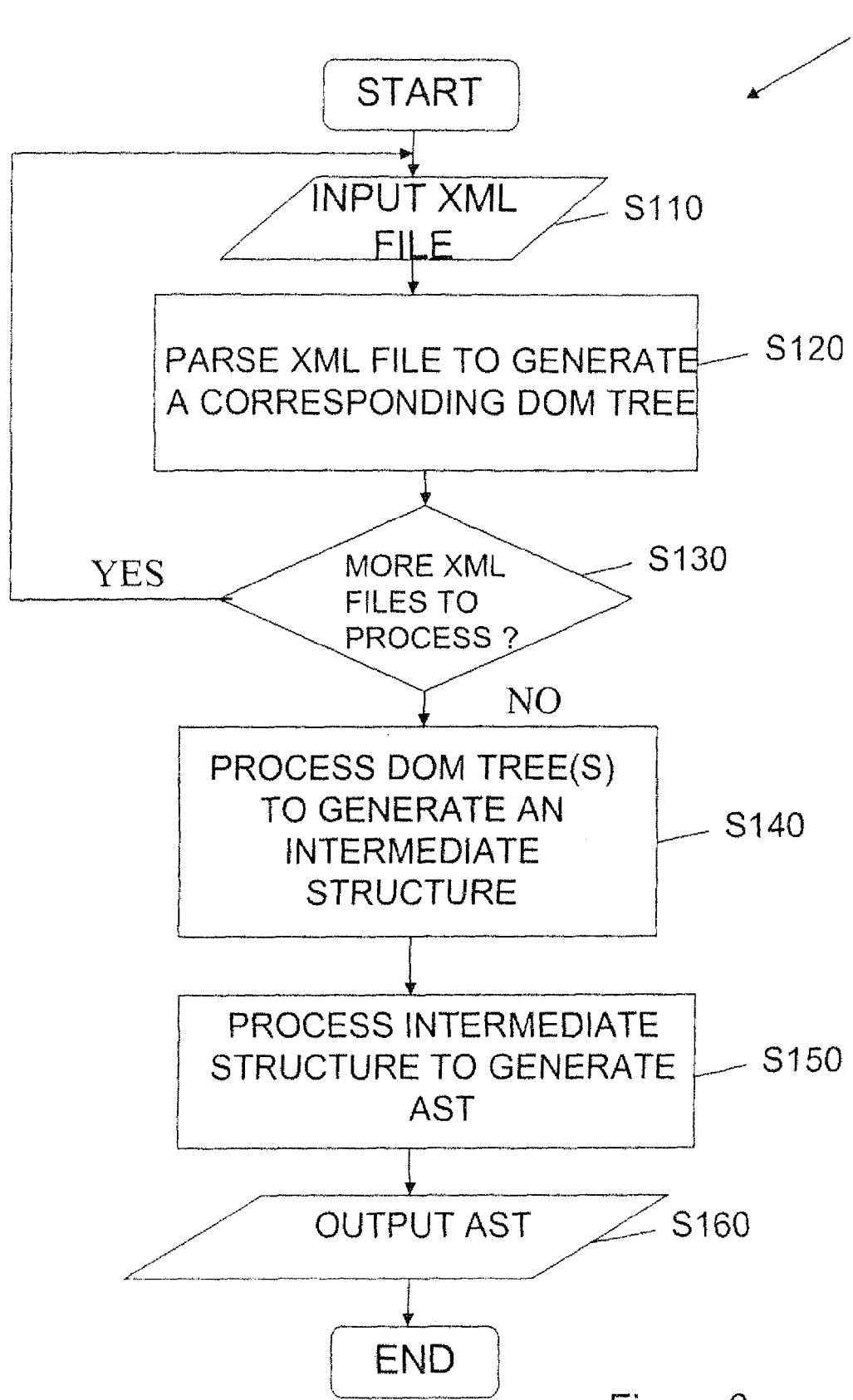
FIG. 6 is a flow diagram of the steps of the 'generate AST' subroutine of the flow chart of FIG. 5.

Referring now to FIG. 6, the way in which subroutine S100 operates to generate an AST according to the present invention will now be described in overview.

Subroutine S100 commences at step S110 in which an example XML file (which has a structure reflecting the structure of the associated database from which any instance data contained in the XML document is derived) is input to the process.

At step S120 the input XML file is parsed using a conventional XML to Document Object Model (DOM) tree parsing application (it will be appreciated that there are a large number of publicly available applications which perform this function) to generate a DOM tree representation of the input XML file.

At step S130 it is determined if there are more example XML files to be used in generating the AST. If so, the method returns to step S110 and steps S110 and S120 are repeated for each additional example XML file. Once all of the example XML files have been converted into corresponding DOM trees the subroutine S100 proceeds to step S140.

In step S140 each DOM tree generated previously is processed in a manner described in greater detail below to generate an intermediate structure (which is also described in greater detail below).

In step S150 the intermediate structure generated in step S140 is processed to generate an AST in a manner described in greater detail below.

Finally, in step S160 the AST generated in step S150 is output, as the final output of the subroutine, to whichever process (or thread) called the subroutine; upon completion of step S160 the subroutine ends.

How the Intermediate Structure is Built

During DOM tree traversal, when an Element node is met, provided that it is not already in the linked list, a new reference to the node is formed in the linked list. The references to nodes are constructed by referring to the Nodes from the structure of the DOM tree, so that it is possible to traverse the DOM tree directly from a reference to a node in the linked list. This list (or in actual fact list of lists) groups together the Elements that have the same Element node name into individual lists. Any repeated Element (ie having the same name, the same children elements and the same attributes) is discarded. Below, the algorithm for this intermediate structure building is described using pseudo-code.

```
ISBuilder(Node n) {
    If (n is an element type)
        If (a reference to n is not in the list)
            Add(reference to n to the list)
            For all n's children n₁ to nₘ do
                ISBuilder(nᵢ)              where (1 ≤ i ≤ m)
}
```

The Intermediate Structure

As mentioned above, having parsed an XML file the parser returns a DOM tree structure (see below). This is an n-ary tree that can be walked to generate DTD/Schema code for the XML file, What this embodiment performs is creation of an Intermediate Structure (IS), the role of which is to group together DOM tree nodes in a way that:

a) the task of code generation becomes much easier, as the IS bundles the related nodes into a sub-structure of their own b) by maintaining a single IS that can serve several XML files, a single DTD/Schema file may easily be generated which encompasses the union of all their features.

Figure 7:
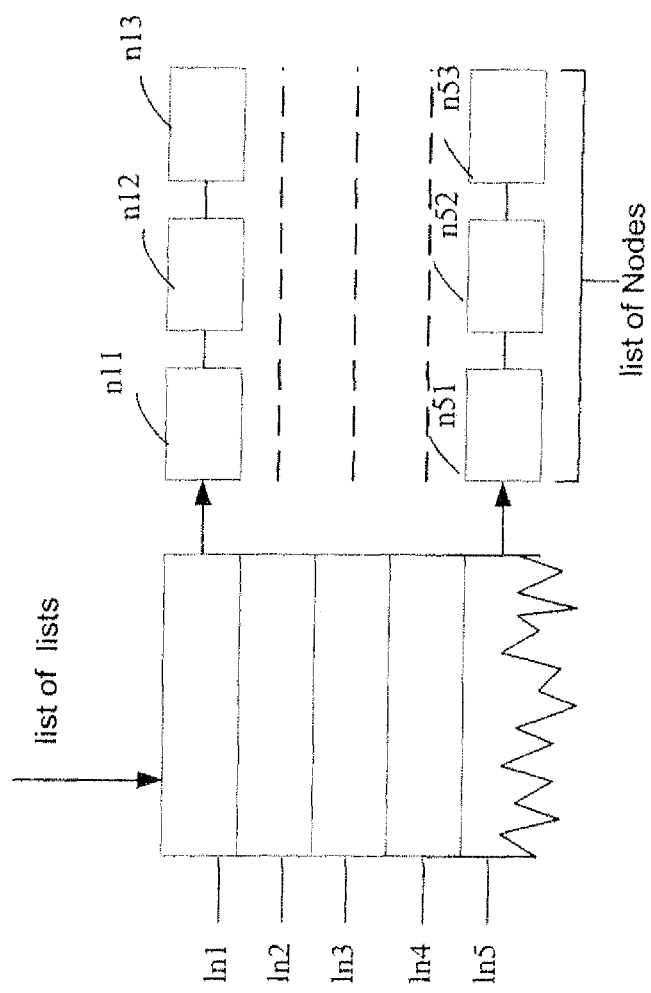
FIG. 7 is a schematic diagram of the structure of a typical Intermediate Structure generated in the subroutine of FIG. 6.

Referring now to FIG. 7, during the course of walking the DOM tree, whenever a node of an element type is encountered, if the node n11, n51 (in actual fact for efficiency purposes a pointer or reference to the actual node in the relevant DOM tree) does not exist in the IS, a new common list of nodes In1-In5 is added to the IS and the new node is added to the respective new list. However, if an element node n12, n13, n52, n53 of the same name but with a differing attribute list or child list is encountered, this element node is kept in the same list In1-In5 as the first encountered node of that name. If a node is encountered with the same name and the same child list and attribute list as a previously encountered node, no record is kept of the newly encountered node and the procedure passes on to the next node.

DOM Tree

As mentioned above, a DOM parser takes an XML file as input and generates a corresponding DOM tree. In Java each node of the tree is an element of a type which implements the interface referred to in Java as Node. Consider the following XML document:

```
<books>
    <book name="Hamlet">
        <author>
            William Shakespeare
        </author>
    </book>
    <book name="Ulysses">
        <author>
            James Joyce
        </author>
    </book>
</books>
```

Figure 8:
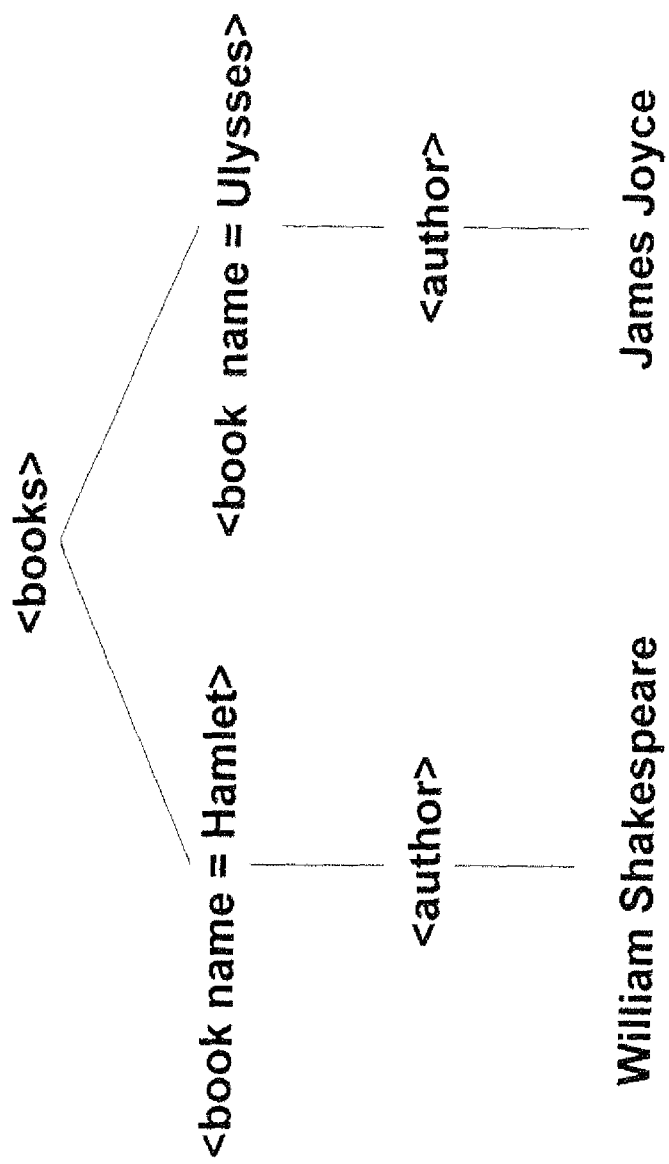
FIG. 8 is a schematic diagram of the structure of an example DOM tree generated in the subroutine of FIG. 6.
Figure 9:
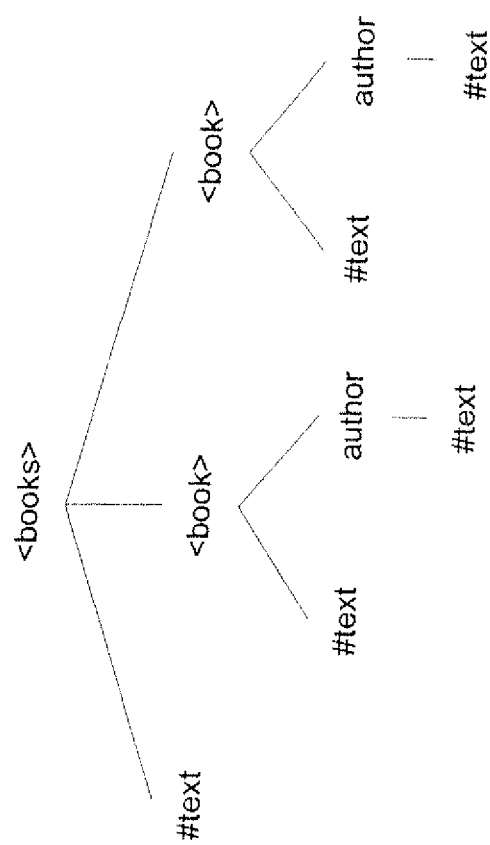
FIG. 9 is a schematic diagram of the structure of an example DOM tree similar to that of FIG. 8, but showing extra empty text which needs to be pruned.

This XML file, after parsing by an XML to DOM tree parser, results in a tree structure which can be visually represented as in FIG. 8. However, since XML documents are text based, any text, including the texts that are put there for indentation and readability (i.e. blank space) are returned by some simple XML to DOM tree parsers as a child of some Node, as #text (see FIG. 9). To generate a DTD/Schema file which correctly validates the XML file these "#text"s, which represent blank spaces only, need to be pruned. The pseudo-code below presents the algorithm to prune the DOM tree for this purpose employed in the present embodiment.

```
removeWhiteTextNode(Node n) {
    For all n's children n₁ to nₘ do
        If (n is a text type AND it is white space) {
            remove(nᵢ)                    where (1 ≤ i ≤ m)
            removeWhiteTextNode(n)
        }
    For all n's children n₁ to nₘ do
        removeWhiteTextNode (nᵢ)          where (1 ≤ i ≤ m)
}
```

As should be clear, what this algorithm does is to go down the DOM tree depth-first-left-to-right and prune the #text. The reason for recalling the method after removing a detected blank space is to traverse the tree a second time to prevent only the first encountered #text being pruned. This is generally unnecessary as the blank space will generally be a leaf node.

Modularising Schema Design Development

One of the more powerful by-products of generating an Intermediate Structure (IS) is that since the code generation phase of system is delayed to post IS phase, it is possible to use and expand the building of the IS across several XML/DOM tree structures to one super-IS which will generate a single DTD/schema file which serves all those XML files (providing they have the same root Element). This enables the XML designer to a) modularise the XML/schema design by designing the different parts of XML/schema file separately; and b) concentrate on the concrete cases rather than some vague abstract.

An Example of Generating an Intermediate Structure

Consider the following very simple XML files:

```
<?xml version="1.0"?>                <?xml version="1.0"?>
<!DOCTYPE D SYSTEM "AA1.dtd">        <!DOCTYPE D SYSTEM
<D>                                   "AA1.dtd">
    <A t1="x"/>                      <D>
    <E/>                                 <A t1="x" t2="y"/>
</D>                                     <C/>
                                     </D>
```

Figure 10C:
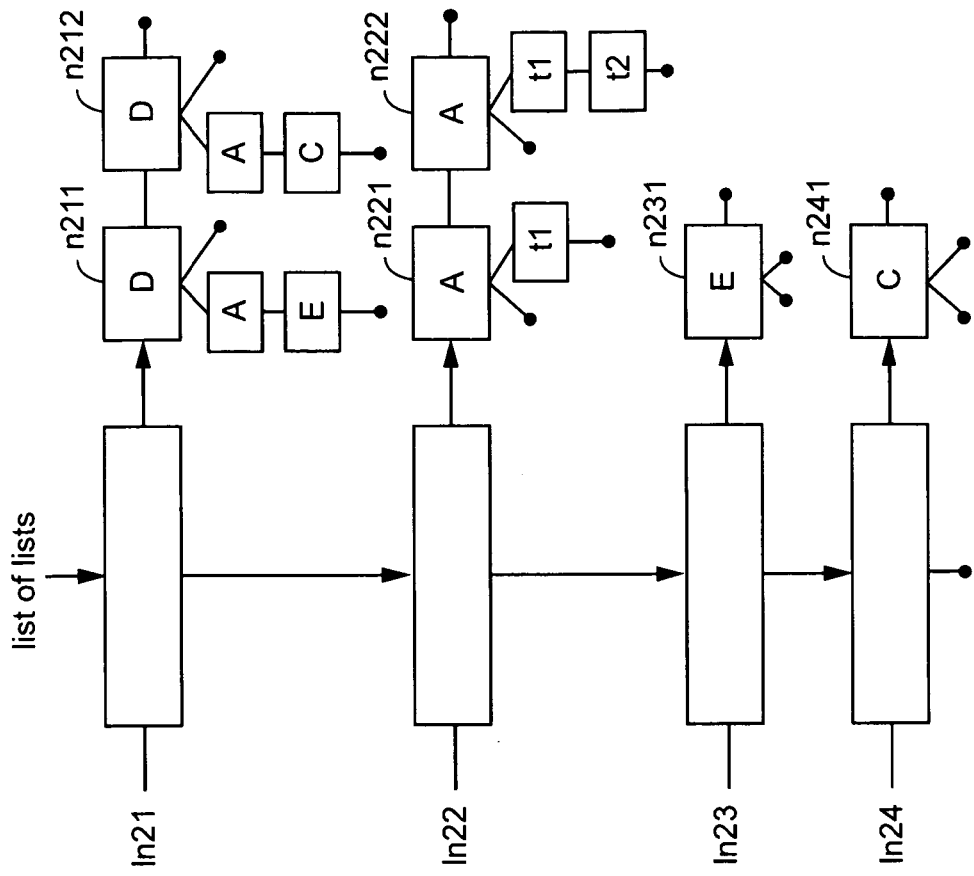
FIG. 10c is a schematic diagram of the structure of the Intermediate Structure generated from the DOM trees of FIGS. 10a and 10b.
Figure 10A:
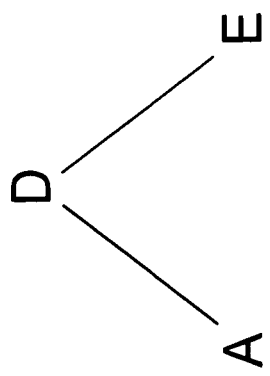
FIG. 10a is a schematic diagram of a pruned DOM tree generated from a first simple example XML file.
Figure 10B:
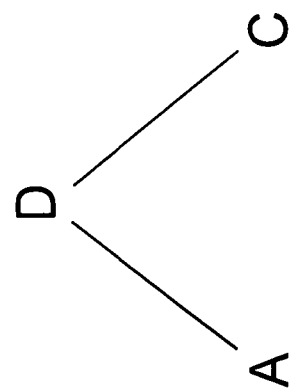
FIG. 10b is a schematic diagram of a pruned DOM tree generated from a second simple example XML file.

The pruned DOM trees generated from these files are shown schematically in FIGS. 10a and 10b respectively. Note that node A of FIG. 10a differs from node A of FIG. 10b in that the latter has attributes t1 and t2 whereas node A in FIG. 10a has attribute t1 only, although this distinction is not shown in FIGS. 10a and 10b. The Intermediate Structure generated from these two DOM trees is illustrated in FIG. 10c. It is arrived at by first parsing the DOM tree of FIG. 10a and encountering firstly node D with children nodes A and E but no attributes and creating a new list In21 and storing therein a reference n211 to node D in the DOM tree of FIG. 10a. It then creates a new list In22 for the A node and stores a reference n221 to node A of the DOM tree of FIG. 10a. The method then causes a list In23 to be created and stores therein a reference n231 to the node E of the DOM tree of FIG. 10a.

The method then proceeds to traverse the DOM tree of FIG. 10b. On encountering node D of the DOM tree of FIG. 10b it determines that it already has a list In21 created for storing references to D nodes; it determines that the D node of FIG. 10b does not have the same children and attributes as the D node of FIG. 10a (note although the attributes are the same since neither has any the child lists are different as one has children A and E whereas the other has children A and C) and therefore stores a new reference n212 to the node D of the DOM tree of FIG. 10b. It then encounters node A of the DOM tree of FIG. 10b, determines that it differs from node A of the DOM tree of FIG. 10a (because it has different attributes) and therefore stores a new reference n222 in list ln22 to the node A of the DOM tree of FIG. 10b. Finally, the method encounters node C of the DOM tree of FIG. 10b, notes that no list yet exists for such nodes and therefore creates a new list ln24 and stores therein a reference n241 to the node C of the DOM tree of FIG. 10b.

Generation of the AST from the Intermediate Structure

Having developed the intermediate structure (hereinafter also referred to as an XML Composition Structure) as described above, the next step is to generate an Abstract Syntax Tree from the Intermediate Structure. In the present embodiment, a cut down Backus-Naur Form (BNF) description of a DTD, as set out below, is used to form the basis of the generation of an AST.

```
<?xml version="1.0"?>          <!ELEMENT R (D, D)>
<!DOCTYPE R SYSTEM "R.dtd">    <!ELEMENT D ((A, C)|(A, E))>
<R>                            <!ELEMENT A EMPTY>
  <D>                          <!ELEMENT E EMPTY>
    <A t1="x"/>                <!ELEMENT C EMPTY>
    <E/>                       <!ATTLIST A t1 CDATA
  </D>                         #REQUIRED>
  <D>                          <!ATTLIST A t2 CDATA
    <A t1="x" t2="y"/>         #IMPLIED>
    <C/>
  </D>
</R>
```

Figure 11:
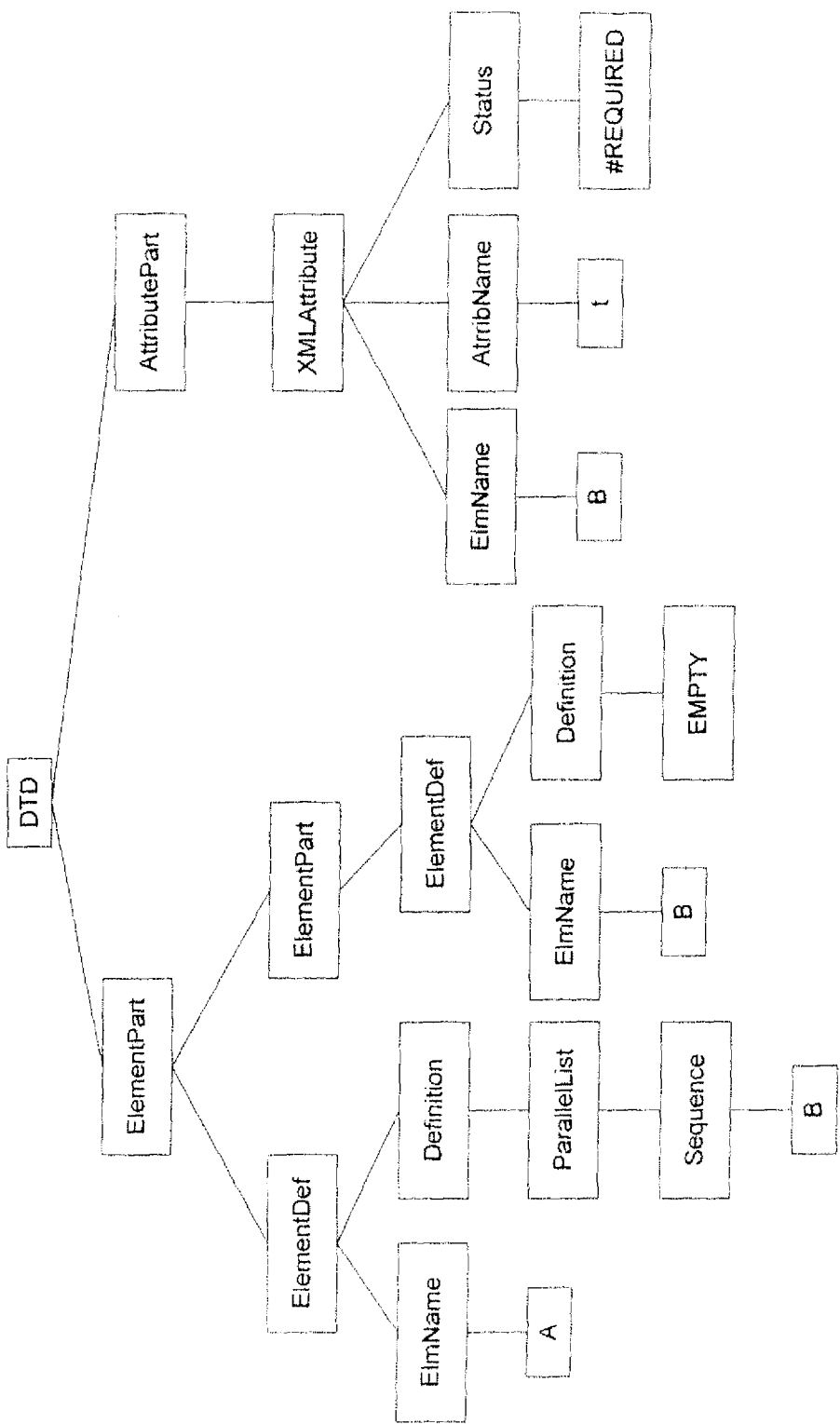
FIG. 11 is a schematic illustration of an abstract syntax tree as generated in an embodiment of the present invention.

The AST is then generated, in the present embodiment, using a syntax directed parsing technique, by traversing the intermediate structure twice, once to get the syntax of the ELEMENT half of the tree and the second time for the attribute list ATTLIST half of the tree (see FIG. 11). To build the Definition nodes in the AST, while walking the XCS (the intermediate structure), the system creates a sequence for each second level list node in the XCS. If there is more than one node in the corresponding second level list a ParallelList is created between the Definition node and each sequence (corresponding to each second level list node).

Note that having built an AST as described above, because it is a live in memory structure (of the schema or structure of the original example XML files) it can be used not only to generate a validator file (e.g. a DTD file) but also it can be accessed by other applications/programs that can benefit from the structure of the merged example XML files.

As a specific, albeit very simple, example of generating an Abstract Syntax Tree from an example XML file according to the present embodiment, consider the following XML file and its associated DTD file:

```
<?xml version="1.0"?>          <!ELEMENT A (B)>
<!DOCTYPE A SYSTEM "R.dtd">    <!ELEMENT B EMPTY>
<A>                            <!ATTLIST B t CDATA
  <B t ="s"/>                  #REQUIRED>
</A>
```

The above XML file produces the following XCS when processed by the system of the present invention:

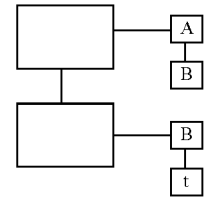

That is to say, the XCS comprises an element part specifying that there are two elements (A and B) and an attribute part specifying that element B has a single attribute (t). Using this XCS the AST illustrated in FIG. 11 is created by the present embodiment using a syntax directed parsing technique (using the syntax defined in the above set-out BNF form of a DTD). At core, the intermediate structure (the XCS) is, in the present embodiment, a list-of-list of Element(s). When the system traverses the XCS, each top list entry (which should hold a distinct element in the input XML file) is added to the Abstract syntax tree as a new element definition.

In the present embodiment, the Abstract Syntax Tree is maintained as an in-memory data structure such that it can be traversed multiple times and such that it can be accessed by application programs that need an awareness of the structure of a group of XML files without necessarily needing to know their authoritative schema—i.e. such an application can directly access the AST to gather necessary information without ever needing to consult or even build an explicit associated schema.

FURTHER EXAMPLE

Figure 12:
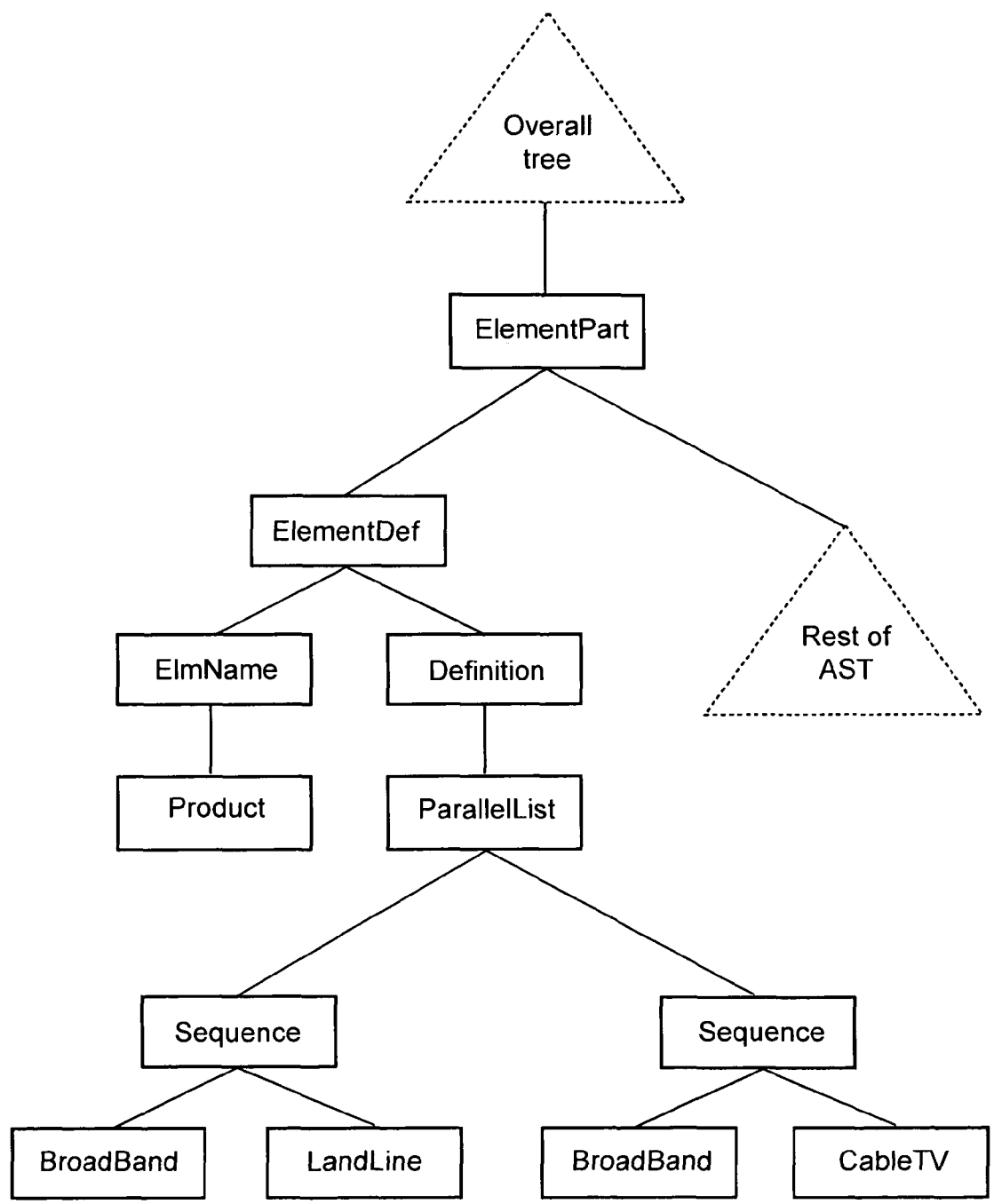
FIG. 12 is a schematic illustration of another abstract syntax tree as generated in an embodiment of the present invention.

With reference to FIG. 12, there is now described a further example in which there are two hypothetical companies, a telecom company TeleEasy and a cable company Green Wood, coming together to provide their customers the following list of products:

Two separate broadband packages
Landline telephony
Cable TV

The individual products provided by the respective companies are described in the example XML documents set out below:

```
Green Wood XML document
<?xml version="1.0" encoding="utf-8"?>
<!DOCTYPE company SYSTEM "deal.dtd">
<company>
  <name>Green Wood</name>
  <product>
    <broadBand>
      <price>11.50</price>
      <speed>2GB</speed>
      <type>Cable</type>
    </broadBand>
    <cableTV>
      <packages>
        <basic>
          <price>16.50</price>
          <sportChannel>5</sportChannel>
          <newsChannel>4</newsChannel>
          <entertainment>20</entertainment>
          <drama>8</drama>
        </basic>
        <full>
```

-continued

```
      <price>20.50</price>
      <sportChannel>8</sportChannel>
      <newsChannel>7</newsChannel>
      <entertainment>30</entertainment>
      <drama>15</drama>
      <shopping>10</shopping>
      <game>5</game>
    </full>
   </packages>
  </cableTV>
 </product>
</company>
TeleEasy XML Document
<?xml version="1.0" encoding="utf-8"?>
<!DOCTYPE company SYSTEM "deal.dtd">
<company>
  <name>TeleEasy</name>
  <product>
    <broadBand>
      <price>12.80</price>
      <speed>8GB</speed>
      <type>ADSLMax</type>
    </broadBand>
    <landLine>
      <price>pay as you go</price>
      <services>
        <audioConf>yes</audioConf>
        <callerID>yes</callerID>
        <callWaiting>yes</callWaiting>
      </services>
    </landLine>
  </product>
</company>
Unified DTD Deal.dtd
<!ELEMENT company (name, product)>
<!ELEMENT name (#PCDATA)>
<!ELEMENT product ((broadBand, landLine)|(broadBand, cableTV))>
<!ELEMENT broadBand (price, speed, type)>
<!ELEMENT price (#PCDATA)>
<!ELEMENT speed (#PCDATA)>
<!ELEMENT type (#PCDATA)>
<!ELEMENT cableTV (packages)>
<!ELEMENT packages (basic, full)>
<!ELEMENT basic (price, sportChannel, newsChannel, entertainment, drama)>
<!ELEMENT sportChannel (#PCDATA)>
<!ELEMENT newsChannel (#PCDATA)>
<!ELEMENT entertainment (#PCDATA)>
<!ELEMENT drama (#PCDATA)>
<!ELEMENT full   (price, sportChannel, newsChannel, entertainment, drama, shopping, game)>
<!ELEMENT shopping (#PCDATA)>
<!ELEMENT game (#PCDATA)>
<!ELEMENT landLine (price, services)>
<!ELEMENT services (audioConf, callerID, callWaiting)>
<!ELEMENT audioConf (#PCDATA)>
<!ELEMENT callerID (#PCDATA)>
<!ELEMENT callWaiting (#PCDATA)>
```

The system of the present embodiment pulls their separate products together to create a uniform data model, by generating an AST merging the structures of the separate XML files describing their separate products (each example XML file reflecting the respective databases of the respective companies TeleEasy and Green Wood) and from which the above unified DTD (Deal.dtd) is produced. Now having an abstract syntax tree that is a uniform data model, the virtual integrated view generation module (a Java based program using the Java JTree API) uses the Abstract Syntax Tree to present a virtual integrated view of both product lines.

A corresponding partial view of the AST produced by the virtual integrated view module 1240 is shown in FIG. 12.

A significant point to note is that the actual data is not merged and they are still sitting at various XML databases (this could be because the data is too large or there is propriety access charge per query for it or there is legal restriction or for any other practical reason we can not do the merging). Nonetheless, the model gives an overall view of the data which (with suitable additional software) the user can interrogate without requiring to have any knowledge of how the overall model is composed of multiple component parts.

The invention claimed is:

1. A method comprising:
   generating syntax tree representation of a plurality of marked up documents which reflect structures of databases via a method of generating a syntax tree representation of a plurality or marked-up documents, the method of generating a syntax tree representation of the plurality of marked-up documents including:
      in respect of each of the plurality of marked-up documents, generating a tree-structured document object model of the marked-up document;
      traversing each document object model to generate an intermediate structure comprising a list of lists of elements and sub-elements; and
      generating a syntax tree representation of the intermediate structure; wherein the intermediate structure merges the information from the plurality of marked-up documents and wherein the syntax tree representation represents an internal representation of the merged structure; and
   generating a virtual integrated view of a combination of the databases based on the syntax tree representation of the plurality of marked up documents which reflect structures of databases;
   wherein said traversing each document object model to generate an intermediate structure comprises:
      each time a node is encountered which does not have the same name as any previously encountered node, updating the intermediate structure by referencing the node in question, and
      each time a node is encountered which does have the same name as any previously encountered node, comparing its child and attribute lists with those of the or each previously encountered node having the same name and, if there is a match, keeping no record of the newly encountered node, but if there is a mismatch, then keeping a record of the newly encountered node within the same list as the previously encountered node of the same name.

2. A method according to claim 1 wherein the marked-up documents are documents marked-up according to the eXtensible Markup Language (XML) standard.

3. A system for generating a syntax tree representation of a plurality of marked-up documents, the system including:
   an input interface for receiving a plurality of marked-up documents, and
   a computer system, comprising at least one computer processor, the computer system being configured to implement at least:
      a document object model generation module operable to generate a tree-structured document object model of each marked-up document;
      an intermediate structure generation module operable to traverse each document object model to generate an intermediate structure comprising a lists of elements and sub-elements; and
      a syntax tree generation for generating a syntax tree representation of the intermediate structure; wherein:
   the intermediate structure merges the information from the plurality of marked-up documents, the syntax tree representation represents an internal representation of the merged structure:

the computer further implements a virtual integrated view module operable to generate a view of the syntax tree which may be conveniently displayed to the user on a graphical display, by providing the system with a plurality of marked-up documents reflecting the structures of a plurality of databases, the virtual integrated view module is operable to provide a virtual integrated view of the plurality of databases, the intermediate structure generation module is operable to generate an intermediate structure by traversing each document object model, each time a node is encountered which does not have the same name as any previously encountered node, updating the intermediate structure by referencing the node in question, and each time a node is encountered which does have the same name as any previously encountered node, comparing its child and attribute lists with those of the or each previously encountered node having the same name and, if there is a match, keeping no record of the newly encountered node, but if there is a mismatch, then keeping a record of the newly encountered node within the same list as the previously encountered node of the same name.

4. A method comprising:

generating a syntax tree representation of a plurality of marked-up documents which reflect structures of databases via a method of generating a syntax tree representation of a plurality of marked-up documents, the method of generating a syntax tree representation of the plurality of marked-up documents including:

in respect of each of the plurality of marked-up documents, generating a tree-structured document object model of the marked-up document;

traversing each document object model to generate an intermediate structure comprising a list of lists of elements and sub-elements; and generating a syntax tree representation of the intermediate structure, wherein the intermediate structure merges the information from the plurality of marked-up documents, and wherein the syntax tree representation represents an internal representation of the merged structure; and generating a virtual integrated view of a combination of the databases based on the syntax tree representation of the plurality of marked up documents which reflect structures of databases; wherein said traversing each document object model to generate an intermediate structure comprises:

each time a node is encountered which does not have the same name as any previously encountered node, creating a new list in the intermediate structure referencing the node in question, and each time a node is encountered which does have the same name as any previously encountered node, comparing its child and attribute lists with those of the or each previously encountered node having the same name and, if there is a match, not making a reference to the newly encountered node, but if there is a mismatch, then making a new reference to the newly encountered node within the same list as the previously encountered node of the same name.

5. A method according to claim 4 wherein the marked-up documents are documents marked-up according to the eXtensible Markup Language (XML) standard.

6. A system for generating a syntax tree representation of a plurality of marked-up documents, the system including:

an input interface for receiving a plurality of marked-up documents, and a computer system, comprising at least one computer processor, the computer system being configured to implement at least:

a document object model generation module operable to generate a tree-structured document object model of each marked-up document;

an intermediate structure generation module operable to traverse each document object model to generate an intermediate structure comprising a list of lists of elements and sub-elements; and a syntax tree generation module for generating a syntax tree representation of the intermediate structure; wherein:

the intermediate structure merges the information from the plurality of marked-up documents;

the syntax tree representation represents an internal representation of the merged structure;

the computer system further implements a virtual integrated view module operable to generate a view of the syntax tree which may be conveniently displayed to the user on a graphical display;

by providing the system with a plurality of marked-up documents reflecting the structures of a plurality of databases, the virtual integrated view module is operable to provide a virtual integrated view of the plurality of databases;

the intermediate structure generation module is operable to generate an intermediate structure by traversing each document object model;

each time a node is encountered which does not have the same name as any previously encountered node, creating a new list in the intermediate structure referencing the node in question; and each time a node is encountered which does have the same name as any previously encountered node, comparing its child and attribute lists with those of the or each previously encountered node having the same name and, if there is a match, not making a reference to the newly encountered node, but if there is a mismatch, then making a new reference to the newly encountered node within the same list as the previously encountered node of the same name.

7. A system according to claim 6 wherein the marked-up documents are documents marked-up according to the eXtensible Markup Language (XML) standard.

8. A non-transitory computer-readable medium for storing a computer program or suite of computer programs for causing a computer or computers to provide operation comprising:

generating a syntax tree representation of a plurality of marked-up documents which reflect structures of databases via a method of generating a syntax tree representation of a plurality of marked-up documents, the method of generating a syntax tree representation of the plurality of marked-up documents including:

in respect of each of the plurality of marked-up documents, generating a tree-structured document object model of the marked-up document;

traversing each document object model to generate an intermediate structure comprising a list of lists of elements and sub-elements; and generating a syntax tree representation of the intermediate structure;

wherein the intermediate structure merges the information from the plurality of marked-up documents, and wherein the syntax tree representation represents an internal representation of the merged structure; and generating a virtual integrated view of a combination of the databases based on the syntax tree representation of the plurality of marked up documents which reflect structures of databases; wherein said traversing each document object model to generate an intermediate structure comprises:

each time a node is encountered which does not have the same name as any previously encountered node, creating a new list in the intermediate structure referencing the node in question; and each time a node is encountered which does have the same name as any previously encountered node, comparing its child and attribute lists with those of the or each previously encountered node having the same name and, if there is a match, not making a reference to the newly encountered node, but if there is a mismatch, then making a new reference to the newly encountered node within the same list as the previously encountered node of the same name.

9. A non-transitory computer-readable medium according to claim 8 wherein the marked-up documents are documents marked-up according to the eXtensible Markup Language (XML) standard.

* * * * *